(12) United States Patent
Friend

(10) Patent No.: US 7,216,573 B2
(45) Date of Patent: May 15, 2007

(54) PORTABLE SHEAR

(76) Inventor: Doug Friend, 614 Park Ave., Albert Lea, MN (US) 56007

( * ) Notice: Subject to any disclaimer, the term of this patent is extended or adjusted under 35 U.S.C. 154(b) by 0 days.

(21) Appl. No.: 10/768,683

(22) Filed: Jan. 30, 2004

(65) Prior Publication Data

US 2005/0166734 A1 Aug. 4, 2005

(51) Int. Cl.
*B26D 1/00* (2006.01)
(52) U.S. Cl. ............................ 83/198; 83/859
(58) Field of Classification Search ................. 83/198, 83/180, 54, 859; 248/558, 224.8; 220/756
See application file for complete search history.

(56) References Cited

U.S. PATENT DOCUMENTS

| | | | | |
|---|---|---|---|---|
| 2,501,572 | A | * 3/1950 | Marquez | 220/521 |
| 2,695,059 | A | * 11/1954 | Ernst | 83/199 |
| 2,789,639 | A | * 4/1957 | Lorentzen | 83/13 |
| 3,013,833 | A | * 12/1961 | Gwin et al. | 294/65 |
| 3,046,856 | A | * 7/1962 | Baxter | 404/118 |
| 3,469,750 | A | * 9/1969 | Vanderbeck | 225/94 |
| 3,955,453 | A | * 5/1976 | Carmichael et al. | 83/189 |
| 3,972,116 | A | * 8/1976 | Forsythe et al. | 606/101 |
| 4,409,871 | A | * 10/1983 | Neumann | 83/104 |
| 5,016,505 | A | * 5/1991 | Chapman | 83/198 |
| 5,092,804 | A | | 3/1992 | Desmarais et al. |
| 5,568,754 | A | | 10/1996 | Chun |
| 5,974,926 | A | | 11/1999 | Kimura |
| 2002/0029674 | A1 | * 3/2002 | Graves et al. | 83/198 |

* cited by examiner

*Primary Examiner*—Kenneth E. Peterson
*Assistant Examiner*—Isaac N. Hamilton
(74) *Attorney, Agent, or Firm*—Vidas, Arrett & Steinkraus

(57) ABSTRACT

A portable shear comprises at least two shear blades. The shear blades are in close proximity with one another, and each shear blade has a cut-out. A force apparatus applies a force to at least one of two blades such that the blades move relative to each other. In a first position the cut-outs of each blade are substantially aligned such that a workpiece having a cross-section substantially identical to a portion of the cut-out can rest simultaneously within the cut-outs of each blade. In a second position the cut-outs of each blade are not substantially aligned such that a workpiece can be split when the blades move from the first position to the second position.

1 Claim, 10 Drawing Sheets

PORTABLE SHEAR

BACKGROUND OF THE INVENTION

Shears utilizing hydraulic pressure for cutting various materials are known. This invention relates to an apparatus for shearing workpieces such as unistrut or garage door track. The need arises at construction sites for cutting unistrut or garage door tracks so they can be fitted into a smaller space and/or joining them end to end in other applications. Conventionally, rotary cutters or cutting presses were employed to this end. Such conventional machines were mostly not portable but were permanently installed. In addition these methods often expose the craftsman to harm as a finger or hand can get cut under a rotary cutter. When on the construction site, hand-held rotary cutters expose the craftsman to heightened injury as the hand-held cutters can slip off the workpiece.

An objection to the prior art cutting machines is that the machines are so bulky and heavy, that they could not be transported to construction sites without difficulty. Some of the cutting presses are additionally objectionable because they cut by punching, not by shearing, so that the punchings created are wasted. These objections are based in the loss of time, the heightened potential for injury, and the waste material due to the prior art cutting.

There remains a need for a shear that is portable and light enough to carry by hand to a construction site and lowers the risk of construction site injury.

All US patents and applications and all other published documents mentioned anywhere in this application are incorporated herein by reference in their entirety.

Without limiting the scope of the invention in any way, the invention is briefly summarized in some of its aspects below. Additional details of the invention and/or additional embodiments of the invention may be found in the Detailed Description of the Invention below.

A brief abstract of the technical disclosure in the specification is provided as well for the purposes of complying with 37 C.F.R. 1.72.

SUMMARY OF THE INVENTION

In at least some embodiments the portable shear comprises at least two shear blades. The shear blades may be in close proximity with one another. In some embodiments the shear blades may be in close proximity and may have a cut-out. A force apparatus may apply a force to at least one of the shear blades such that the blades move relative to each other. In at least one embodiment, when in a first position, the cut-outs of each blade may be substantially aligned such that a workpiece, having a cross-section substantially identical to at least a portion of the cut-out, can rest simultaneously within the cut-outs of each blade. In at least one embodiment, when in a second position, the cut-outs of each blade may not be substantially aligned such that a workpiece can be split when the blades move from the first position to the second position. In some embodiments the workpiece may be unistrut or garage door track. In some embodiments any workpiece having a cross-sectional geometry that is open is contemplated. An open geometry may include any shape which does not completely close off an interior space from an exterior space. An example of a closed geometry may be a circle.

It should be noted that at least one embodiment of the invention contemplates the shearing of a workpiece with a closed geometry. In at least one embodiment a mandrel constructed and arranged to fit within a workpiece may have a closed cross-sectional geometry. In at least one embodiment, the mandrel provides support to the interior of the workpiece at a site to be sheared.

In at least one embodiment, the shear may have a frame wherein the shear blades are disposed on a distal portion of the frame and the force apparatus is disposed on a proximal portion of the frame.

In at least one embodiment, the force apparatus may be a hydraulic cylinder.

In at least one embodiment, the cut-outs may have an open configuration.

In at least one embodiment, one blade may be a stationary blade.

In at least one embodiment, the force apparatus may apply a force to a blade such that it may move relative to the stationary blade.

In at least one embodiment while in the first position, the blade moved relative to the stationary blade may be disposed closer to the force apparatus.

In at least one embodiment, a biasing member may exert a force opposite the force the force apparatus applies. In at least one embodiment, the biasing member may move a non-stationary blade such that the shear returns to its first position. In at least one embodiment, the biasing member is at least one spring.

In at least one embodiment, at least one shear blade may be moveable and may be disposed in a track.

In at least one embodiment, a push block may be disposed between the blades and the force apparatus.

In at least one embodiment, the shear may have a handle. In at least one embodiment, the handle may comprise handle portions with frame attachment ends and joining ends. In at least one embodiment, the handle portions may extend from opposite ends of the shear. In at least one embodiment, the handle portions may be constructed and arranged with joining ends capable of fixedly connecting to one another. In at least one embodiment, the joining ends of the handle portions may join by locking the joining end of one handle portion into a recessed portion of the joining end of an oppositely positioned handle portion.

In at least one embodiment, the handle portions may rotatingly engage to the frame.

In at least one embodiment, the handle portions may engage to the frame to stabilize the shear.

In at least one embodiment, the shear can be carried by one person. In at least one embodiment the shear can be carried as one would carry a briefcase. In at least one embodiment the shear is under 75 lbs. In at least one embodiment the shear is under 50 lbs. In at least one embodiment the shear has blades of metal. In at least one embodiment the shear has blades of hardened metal. In at least one embodiment the shear has blades with a hardness of at least 54 on the Rockwell chart.

Additional details and embodiments of the invention are discussed below.

DETAILED DESCRIPTION OF THE INVENTION

Figure 1:
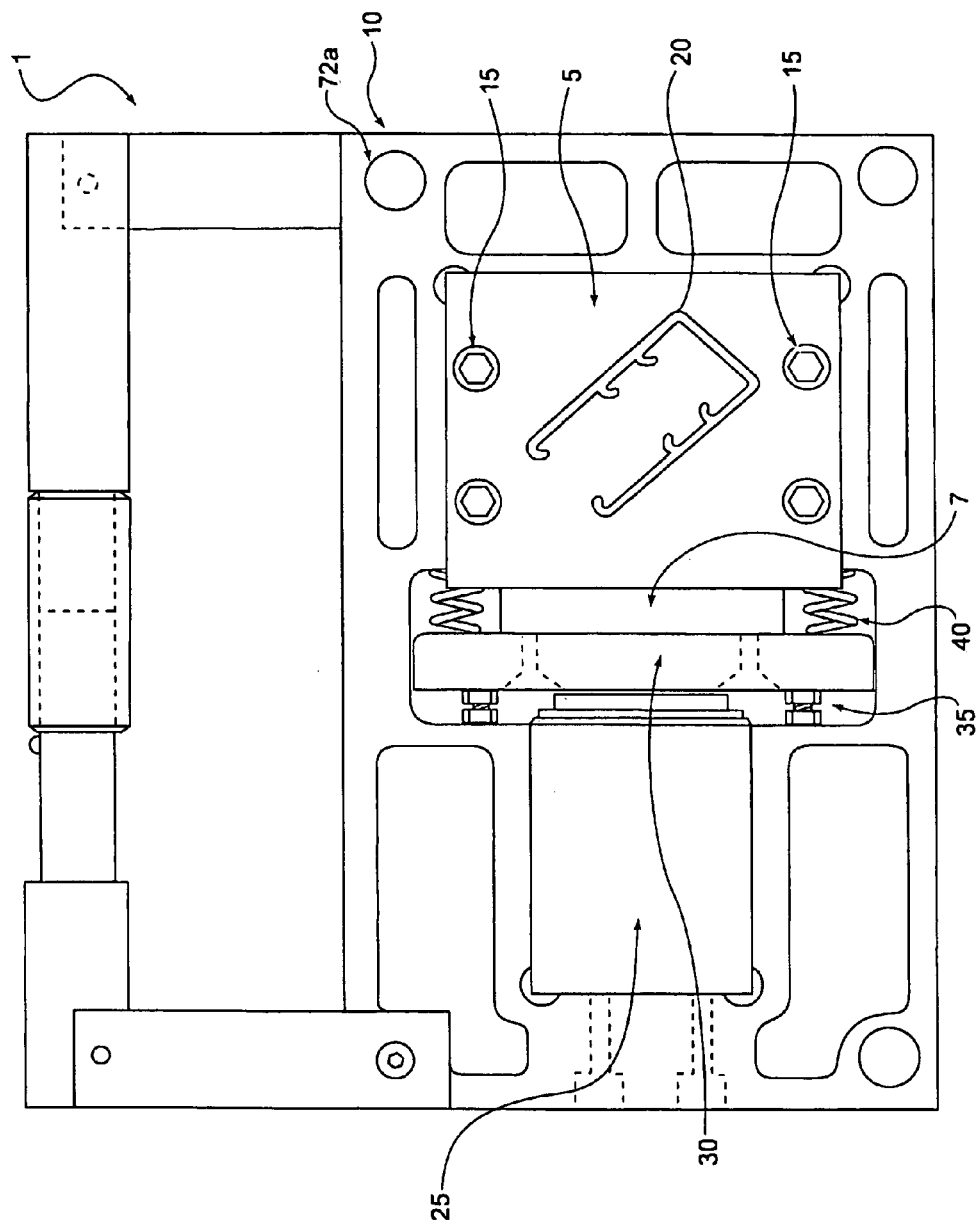
FIG. 1 is a back view of the shear in a first position.

While this invention may be embodied in many different forms, there are shown in the drawings and described in detail herein specific embodiments of the invention. The present disclosure is an exemplification of the principles of the invention and is not intended to limit the invention to the particular embodiments illustrated.

For the purposes of this disclosure, unless otherwise indicated, identical reference numerals used in different figures refer to the same component.

In one embodiment, the invention is directed to a shear such as that shown generally at 1 in FIG. 1. Stationary shear blade 5 is shown immediately in front of moveable shear blade 7 which is not shown in FIG. 1. Shear blades 5 and 7 may be in close proximity to one another. Stationary shear blade 5 may be fixedly engaged to the frame 10 using bolts 15 or some other fastening device that allows for relatively quick removal of the stationary blade 5. In some embodiments the stationary blade 5 may be engaged to the frame using permanent attachment means such as welding. In some embodiments the stationary blade 5 may be a portion of the frame 10.

As shown in FIG. 1 the shear blades 5 and 7 may have a cut-out 20. It is contemplated that the cut-out 20 may be formed through the use of a mold or through cutting means not limited to mechanical cutting, laser cutting, or hydraulic cutting or through punch pressing means. The cut-out 20 may be sized to fittingly accommodate a workpiece having a cross-sectional shape similar to at least a portion of the cut-out 20. The workpiece has a shear site where the workpiece is split in two.

As shown in FIG. 1, a force apparatus 25 is constructed and arranged such that it may apply a force to moveable shear blade 7. This force may be a pushing force or a pulling force. In some embodiments a push block 30 may be used. The push block 30 may be in contact with moveable shear blade 7 and force apparatus 25 such that the force provided by the force apparatus 25 is transferred through the push block 30 to shear blade 7. The push block 30 and moveable shear blade 7 may be attached to one another through by at least one screw.

The force apparatus 25 may be a hydraulic cylinder. Though not shown in FIG. 1 a hydraulic line may have one end of the line attached to the hydraulic cylinder 25 and may also be in hydraulic communication with the hydraulic cylinder 25, and the other end of the hydraulic line may be engaged to and may be in hydraulic communication with a hydraulic foot pump or motorized pump. In some embodiments the pump is capable of providing at least enough pressure to activate movement in the cylinder. The hydraulic cylinder may be a 5 ton to a 100 ton hydraulic cylinder. In at least one embodiment it is a 25 ton hydraulic cylinder.

FIG. 1 also illustrates the use of push block positioners 35. In at least one embodiment, the positioners may be adjustable. In at least one embodiment, the positioners are screws. FIG. 1 also illustrates the use of biasing members 40. In at least one embodiment, a biasing member 40 may exert a force opposite the force the force apparatus applies. In at least one embodiment, the biasing member may move a non-stationary blade such that the shear returns to its first position. In at least one embodiment, the biasing member is at least one spring. The biasing member may be positioned such that it applies a force to the push block 30. The biasing member 40 may be proximal or distal to the push block 30 and may even act on a distal portion of the moveable shear blade 7.

Figure 2:
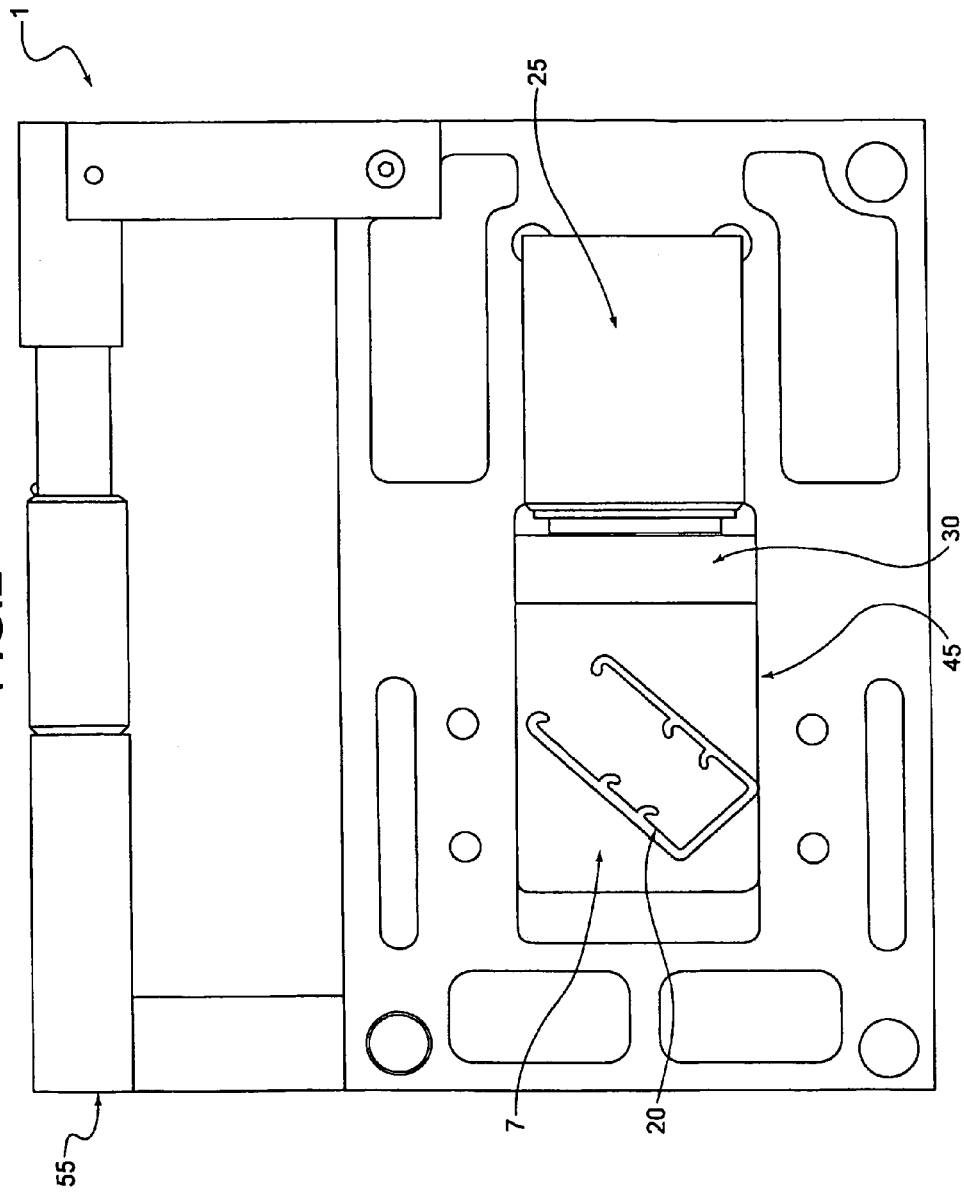
FIG. 2 is a front view of the shear in a first position.
Figure 3:
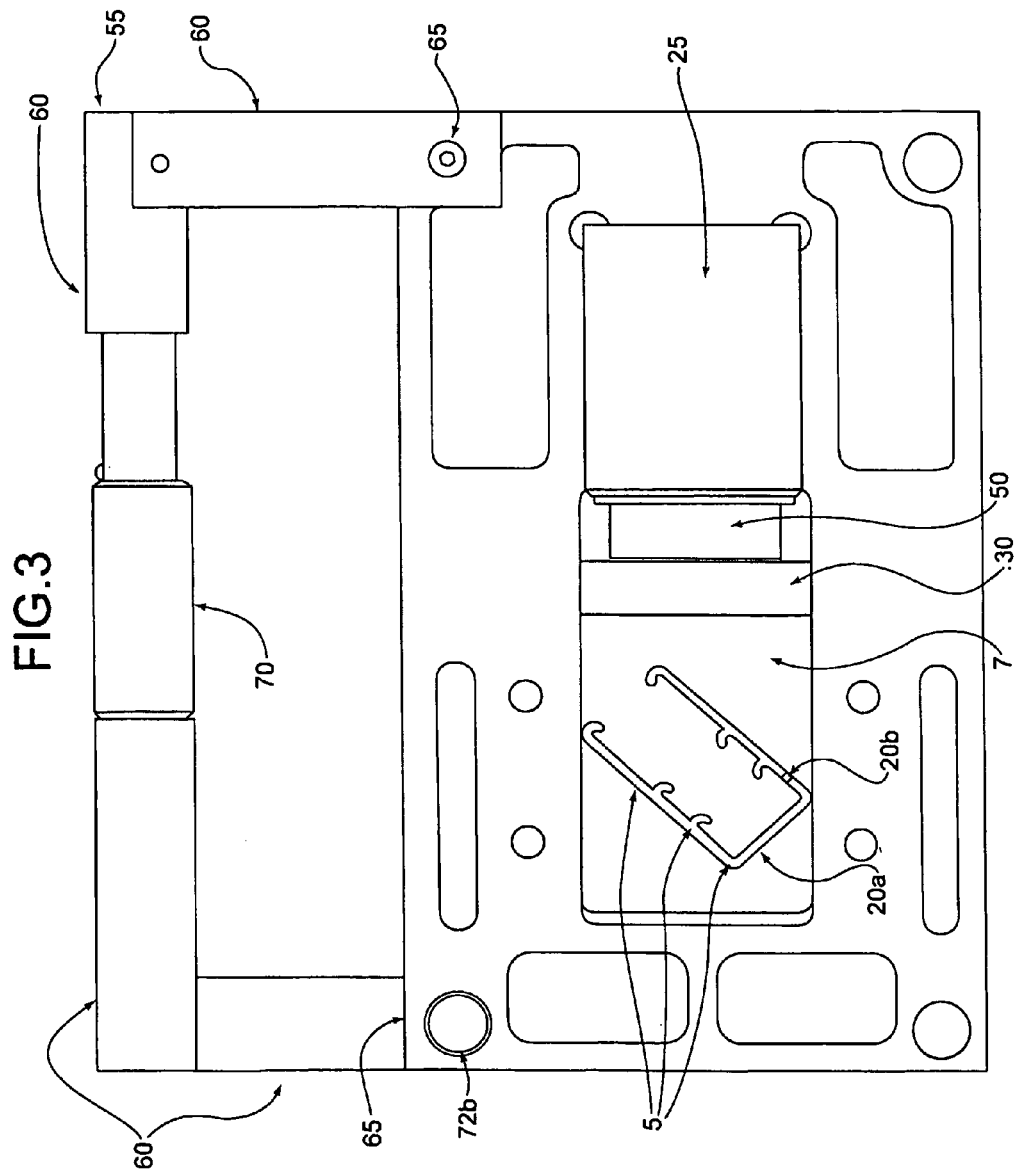
FIG. 3 is a front view of the shear in a second position.

The moveable shear blade 7 is more fully shown in FIG. 2. Blade 7 may be disposed within a track 45. In FIGS. 1 and 2 stationary blades 5 and moveable shear blade 7 are in a first position having cut-outs 20 of blades 5 and 7 which are aligned. When in the first position, a workpiece, having a cross-section substantially identical to at least a portion of the cut-out 20, can rest simultaneously within the cut-outs of each blade 5 and 7. FIG. 3 illustrates the apparatus in a second position having cut-outs 20 of blades 5 and 7 which are not substantially aligned. In at least one embodiment, if a workpiece is disposed within the cut-outs 20 of both blades 5 and 7 while in the first position, movement to the second position may result in the workpiece being split. In at least one embodiment the workpiece is sheared in two.

FIG. 3 illustrates the apparatus in a second position. The moveable blade 7 has been moved in the distal direction and is not aligned with stationary blade 5. The force arm 50 has extended out from the force apparatus 25 and has moved push block 30 and moveable blade 7 in a distal direction. In this second position, the cut-out 20a of moveable blade 7 is not aligned with the cut-out 20b of stationary blade 5. It should be noted that the cut-out 20b of stationary blade 5 is partially visible in FIG. 3 and is quite a small portion of the entire cut-out 20b. Because blades 5 and 7 are not aligned, less of cut-out 20b will be seen in FIG. 3. The only portion of stationary blade 5 shown in FIG. 3 is that showing through the cut-out 20a of moveable blade 7.

FIGS. 1–3 also illustrate the handle 55 of the shear 1 as in at least one embodiment of the invention. In at least one embodiment, the handle 55 may comprise handle portions 60 with frame attachment ends 65 and joining ends 70. In at least one embodiment, the handle portions 60 may extend from opposite ends of the shear 1. In at least one embodiment, the handle portions 60 engage the frame through frame recesses 72a and 72b. In FIG. 3 only the distal frame recess 72b is shown as the frame attachments end 65 of handle portion 60 covers proximal frame recess 72a. In FIG. 1 only the proximal frame recess 72a is shown as distal frame recess 72b is covered. In at least one embodiment, the handle portions 60 may be constructed and arranged with joining ends 70 capable of fixedly connecting to one another. In at least one embodiment, the joining ends 70 of the handle portions 60 may join by locking the joining end 70 of one handle portion 60 into a recessed portion of the joining end of an oppositely positioned handle portion. In at least one embodiment the joining ends 70 abut one another, and a sheath slides over both joining ends and locks into place.

Figure 4:
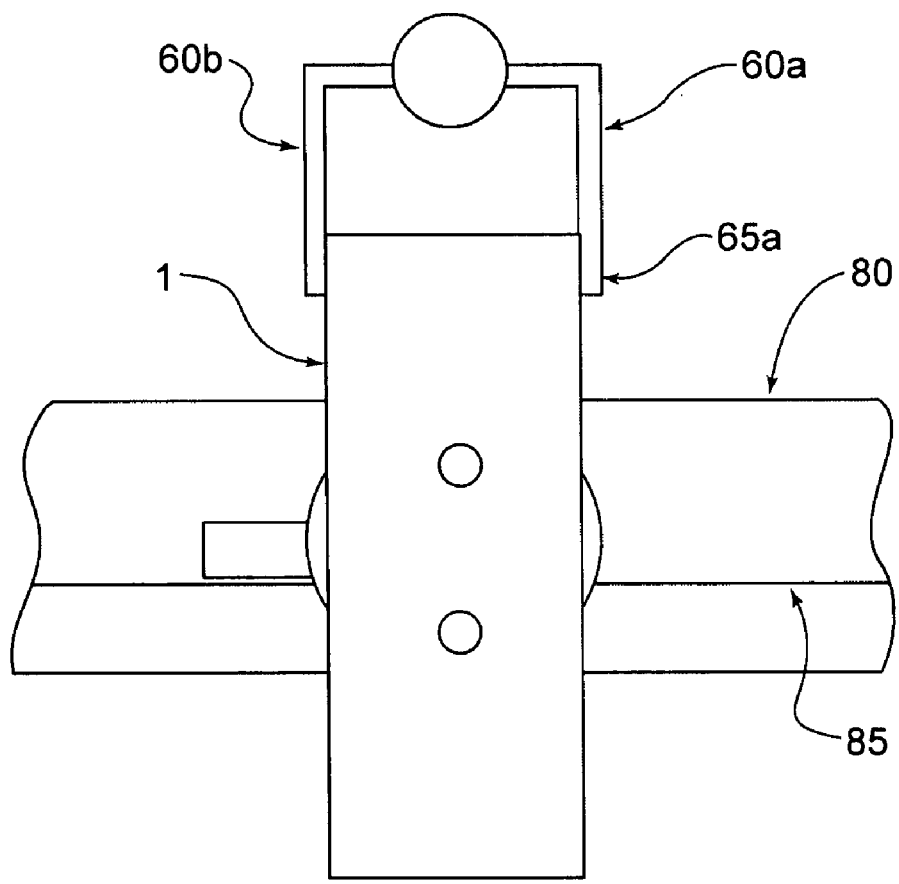
FIG. 4 is a side view of the shear in a first position with a workpiece.

FIG. 4 is a side view of the shear having a workpiece 80 disposed in the cut-outs 20 (the cut-outs not visible in FIG. 4). In some embodiments the workpiece 80 may have a proximal most edge 85. In some embodiments of the invention the cutouts 20 are arranged such that the proximal most portion of the cut-out 20 coincides with a corner edge of the workpiece 80 rather than a flat or broad portion of the workpiece.

Figure 5:
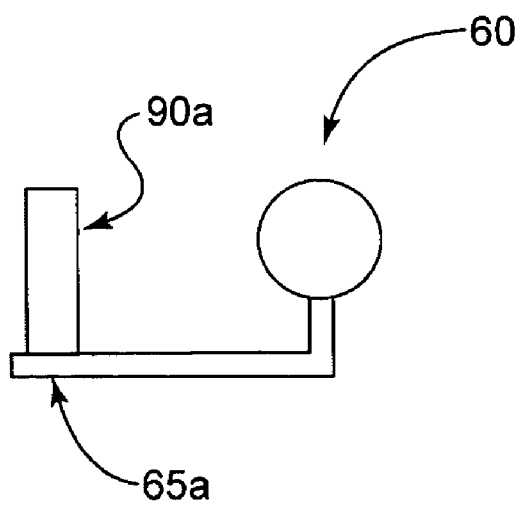
FIG. 5 in side view of a handle portion.

In FIG. 4 a side view of the handle 55 is also shown. Handle portion 60a has a frame attachment end 65a with a cylindrical portion 90a disposed within a proximal frame recess 72a (not shown). This cylindrical portion 90a is better illustrated in FIG. 5 wherein a handle portion 60 is shown.

Figure 6:
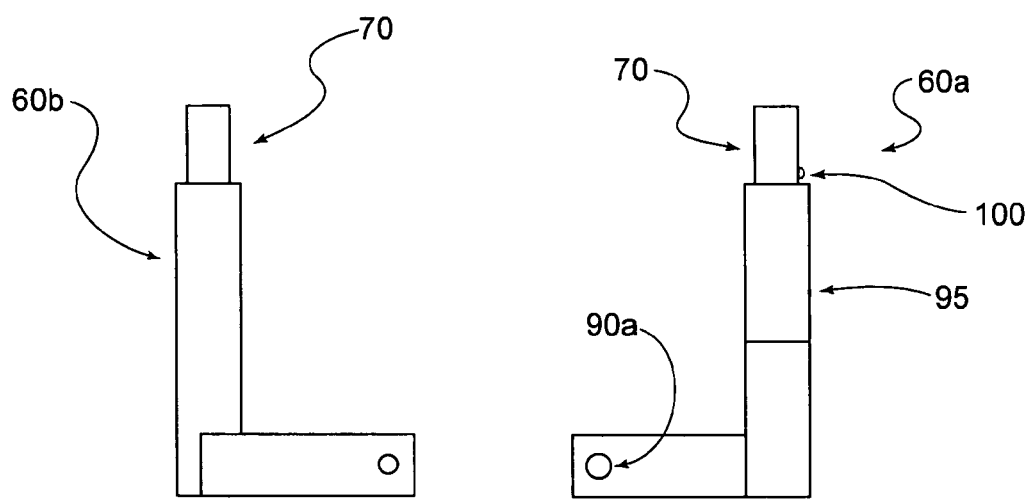
FIG. 6 is a front view of the handle portions.

FIG. 6 illustrates a distal handle portion 60b and a proximal handle portion 60a as used in at least one embodiment of the invention. The proximal handle portion 60a may have a sliding sheath 95 which may be slid over locking ball 100. In some embodiments this action may be accomplished by having a groove in sheath 95 that fits over the ball 100 when the sheath 95 is advanced. In some embodiments, rotating the sheath 95 so that the groove does not line up with the ball 100 in effect locks the handle portions 60a and 60b together. In some embodiments the user first presses the ball 100 in which allows the sheath 95 to pass over the ball 100 and then when the ball is allowed to pop back up the handle portions 60a and 60b are essentially locked together as the sheath 95 keeps them from separating significantly. It should be noted that rather than the user pressing the ball 100 in, the sheath 95 may have at least one end that has an interior diameter that decreases from the end of the sheath such that sliding the sheath towards the ball 100 presses the ball in and does not require the user to press the locking ball 100 in.

Figure 7:
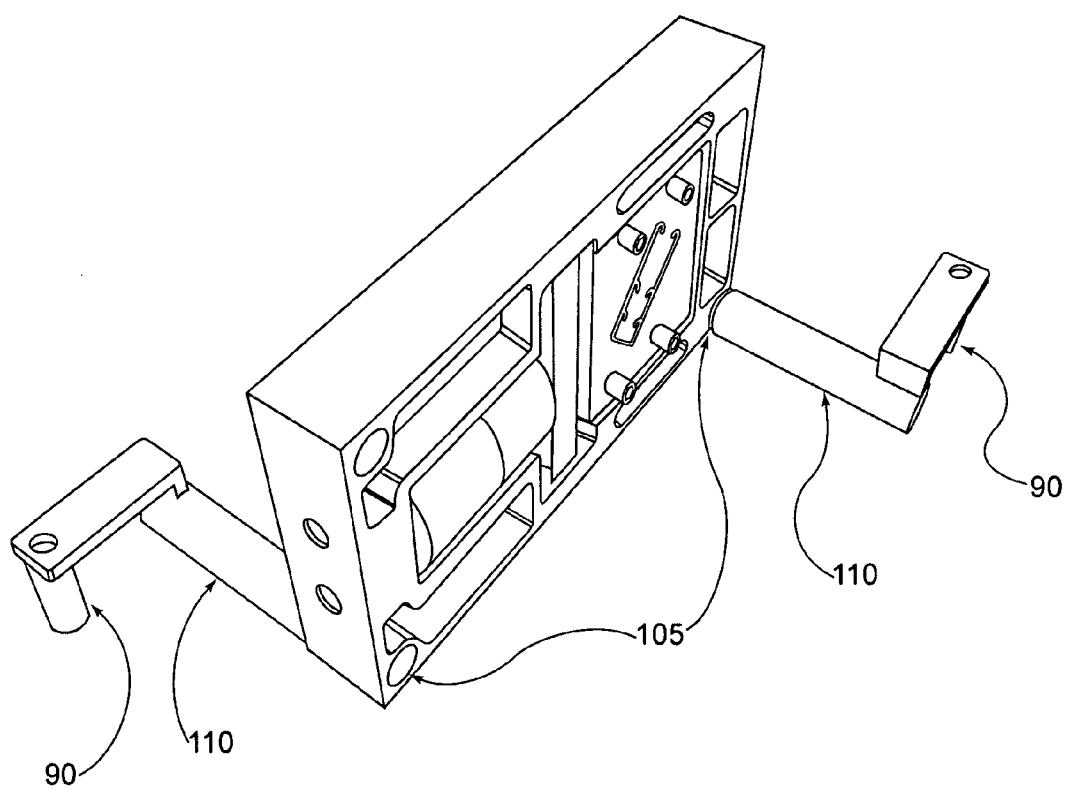
FIG. 7 is a perspective view of the shear.

FIG. 7 illustrates how the handle portions 60a and 60b may also be used to stabilize the shear in some embodiments. In some embodiments, the joining ends 70 of the handle portions 60 may be placed into the bottom frame recesses 105. This provides additional stability. In some embodiments the elongate beam portion 110 of the handle portions 60 contact the surface, upon which the apparatus has been placed, along the length of the elongate beam portion 110. In at least one embodiment the elongate beam portion 110 is rotated such that the unattached end of the cylindrical portion 90 is in contact with the surface.

Figure 8:
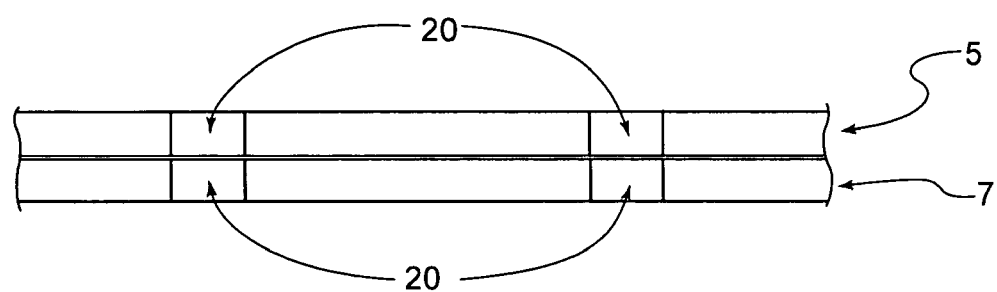
FIG. 8 is a top cut away view of the blades in a first position.
Figure 9:
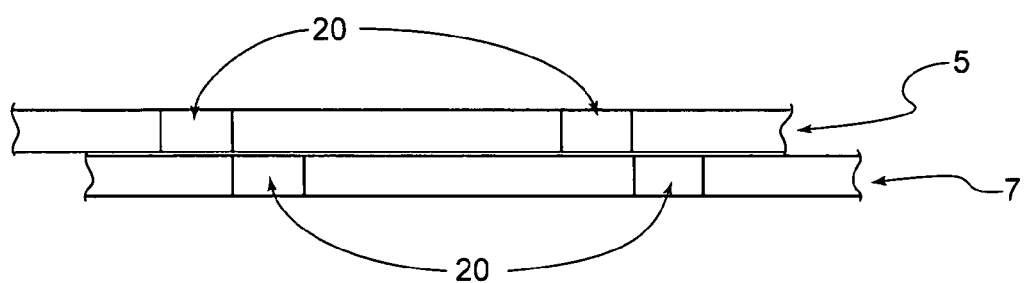
FIG. 9 is a top cut away view of the blades in a second position.

FIG. 8 is a cut away top view of stationary blade 5 and moveable blade 7 in close proximity to one another and with the top portions of the blades removed in order to reveal the cut-out portions 20. In FIG. 8 the cut-outs 20 are substantially aligned and are thus in the first position. When a sufficient force is applied to the moveable blade 7 the blades move into the second position as shown in FIG. 9. In the second position the cut-outs 20 are not aligned.

Figure 10:
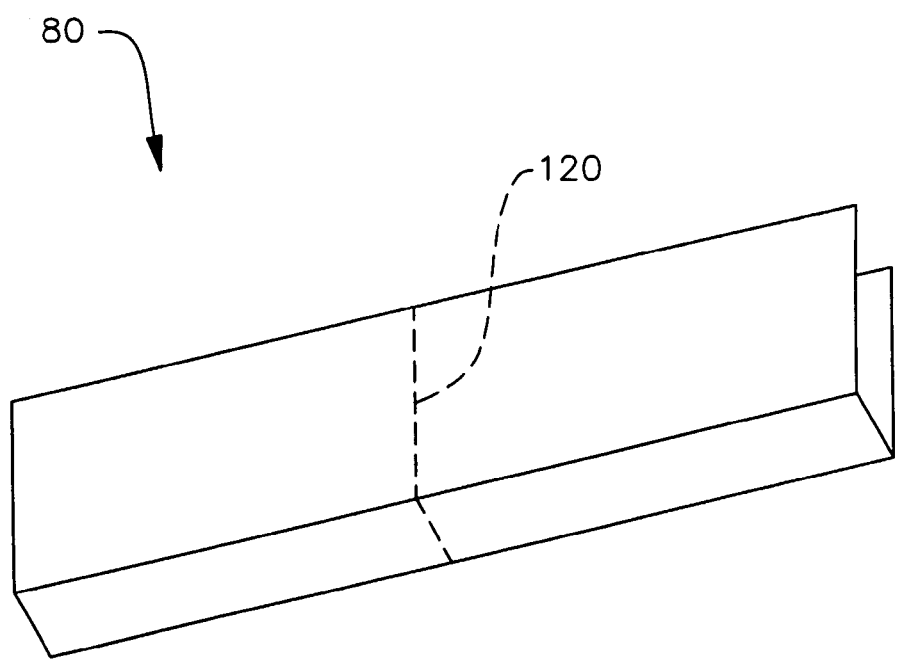
FIG. 10 is a perspective view of a workpiece.

The shear 1 and/or shear blades 5, 7 as shown in FIGS. 1–4 and 7 are illustrated as having cut-outs 20 that have an open geometry. The workpiece 80 as shown in FIG. 10 has an open geometry in cross-section. Thus, the workpiece 80 may be placed within the cutouts 20 of the shear 1 and advanced to the shear site 120. This is the area at which the workpiece 80 is sheared. The blades 5, 7 of FIG. 1 can ten act on substantially all portions of the workpiece 80 along the shear site 120 simultaneously as the blades substantially contact the inside and the outside of the workpiece 80 during shearing.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

The invention claimed is:

1. A portable shear comprising:
 a frame having a proximal end and a distal end between which a hydraulic cylinder, a push block, and a pair of shear blades are disposed, the push block being disposed between and immediately adjacent to both the hydraulic cylinder and the pair of shear blades, the pair of shear blades consisting of a stationary blade and a movable blade, each shear blade having a cut-out, each cut-out having opposite sides and each cut-out having an open configuration such that a portion of the shear blade extends between opposite sides of the cut-out of each shear blade, said shear blades being slidably engaged such that said cut-outs can be aligned;
 the hydraulic cylinder being constructed and arranged to apply a force to the push block which acts on the movable blade such that the movable blade moves in the direction of the force applied by the hydraulic cylinder,
 said hydraulic cylinder supplying a force that drives the moveable blade from a first position where all cut-outs are substantially aligned to a second position where said cut-outs are not aligned such that a workpiece placed in the cut-outs is sheared when the blades move from the first position to the second position;
 the frame having a proximal handle recess and a distal handle recess into which a handle is removably attached, the handle consisting of two handle portions, each handle portion having a frame attachment end and a joining end, the frame attachment end of one of the handle portions engaging the proximal handle recess and the frame attachment end of another of the handle portions engaging the distal handle recess, the joining ends of the handle portions fixedly connecting at a point substantially equidistant from the distal handle recess and the proximal handle recess;
 the frame has stabilizing recesses into which the joining ends of the handle portions can engage to the frame and extend to a floor or wall surface to stabilize the shear.

* * * * *